United States Patent [19]
Hildebrandt

[11] 3,872,691
[45] Mar. 25, 1975

[54] ROTATING METAL SHAFT AND PLASTIC SLEEVE MOUNTING

[75] Inventor: Eugene F. Hildebrandt, Ferguson, Mo.

[73] Assignee: Emerson Electric Co., St. Louis, Mo.

[22] Filed: Mar. 29, 1973

[21] Appl. No.: 345,891

[52] U.S. Cl.............................. 64/27 R, 64/4, 64/6, 64/DIG. 2, 310/68 E
[51] Int. Cl............................................. F16d 3/14
[58] Field of Search........... 64/DIG. 2, 27 R, 9 R, 6, 64/4; 310/68 E

[56] References Cited
UNITED STATES PATENTS

| | | | |
|---|---|---|---|
| 1,636,262 | 7/1927 | Troendly | 64/1 |
| 3,335,580 | 8/1967 | Simpson, Jr. | 64/4 |
| 3,411,323 | 11/1968 | Nehl | 64/27 R |
| 3,440,836 | 4/1969 | Peterson | 64/4 |
| 3,609,421 | 9/1971 | Hilddebrandt | 310/68 |

FOREIGN PATENTS OR APPLICATIONS

| | | | |
|---|---|---|---|
| 1,085,087 | 1/1955 | France | 64/DIG. 2 |

*Primary Examiner*—Samuel Scott
*Assistant Examiner*—Rondall Heald
*Attorney, Agent, or Firm*—Polster and Polster

[57] ABSTRACT

A rotatable metal shaft has a plastic sleeve mounted to it for operatively connecting additional apparatus to the shaft. The shaft has an annular groove formed in it and is provided with at least one spline spaced axially from the groove. The sleeve includes a body part having an axial opening through it for fitting the sleeve to the shaft. One end of the sleeve has a keyway extending radially outwardly of the axial opening while the other end of the sleeve is provided with at least one lug extending radially inwardly of the axial opening. The lug enters the annular groove in the shaft and the keyway receives the spline when the sleeve is placed in position on the shaft. The keyway can be close fitting circumferentially with the spline to provide a rigid mount or oversized circumferentially to provide a limited slip rotational mounting.

1 Claim, 3 Drawing Figures

PATENTED MAR 25 1975 3,872,691

ROTATING METAL SHAFT AND PLASTIC SLEEVE MOUNTING

BACKGROUND OF THE INVENTION

This invention relates to means for attaching a plastic device to a rotating metal shaft. While discussed in detail with respect to electrical motors, those skilled in the art will recognize the wide applicability of this invention to a variety of other rotating shaft applications.

Many electrical motor designs utilize centrifugal actuators for connecting and disconnecting various windings of an electric motor as the motor is started and begins to approach running speed. For example, in a split phase induction motor, it is conventional to mount a centrifugal actuator on the motor shaft. The actuator includes a pair of centrifugal responsive switch contacts which open at some predetermined shaft rotational speed. Opening the switch contacts disconnects the auxiliary winding from the motor electrical circuit for the operational portion of motor "on time." The auxiliary winding is reconnected automatically to the motor electrical circuit when the shaft speed decreases below the opening speed as the centrifugal force developed by shaft rotation is unable to keep the switch contacts separated.

A number of problems are encountered in mounting the actuator to the rotating shaft and in the operation of the actuator itself. For example, torque pulses in an AC electrical motor causes vibration of hinged parts of the centrifugal actuator causing objectionable rattling noise. A solution to this problem is given in the U.S. Patent to Hildebrandt, U.S. Pat. No. 3,609,421, issued Sept. 28, 1971. Both the Hildebrandt patent in particular, and the prior art in general however, heretofore have required the utilization of metal parts for mounting the actuator, even when plastic material was used in the sleeve which is mounted over the rotating shaft. The structure of the invention disclosed hereinafter eliminates the need for additional metal clamping parts between the shaft and the plastic sleeve. That structure enables the sleeve to be fitted on the shaft both axially and torsionally. The device of this invention is positioned axially by means of a groove in the shaft that permits engagement by the shaft of interlocking lugs molded in the sleeve. Rotational drive is provided by a keyway formed in the sleeve that engages at least one spline formed in the shaft.

One of the objects of this invention is to provide a low cost mounting device for mounting objects to a rotating shaft.

Another object of this invention is to provide means for mounting plastic devices to rotating metal shafts.

Other objects of this invention will be apparent to those skilled in the art in light of the following description and accompanying drawings.

SUMMARY OF THE INVENTION

In accordance with this invention, generally stated, a plastic device is provided for mounting on a metal shaft. The shaft has an annular channel formed in it. The shaft also has at least one protrusion or spline spaced axially from the groove, extending outwardly from the shaft. The plastic device includes a sleeve having an axial opening through it for mounting the sleeve over the shaft. A first end of the sleeve has spring grooves in it and at least one lug extending radially inwardly which is engaged in the annular channel. A second end of the sleeve has a keyway formed in it for accepting the shaft spline.

DESCRIPTION OF THE PREFERRED EMBODIMENT

Figure 1:
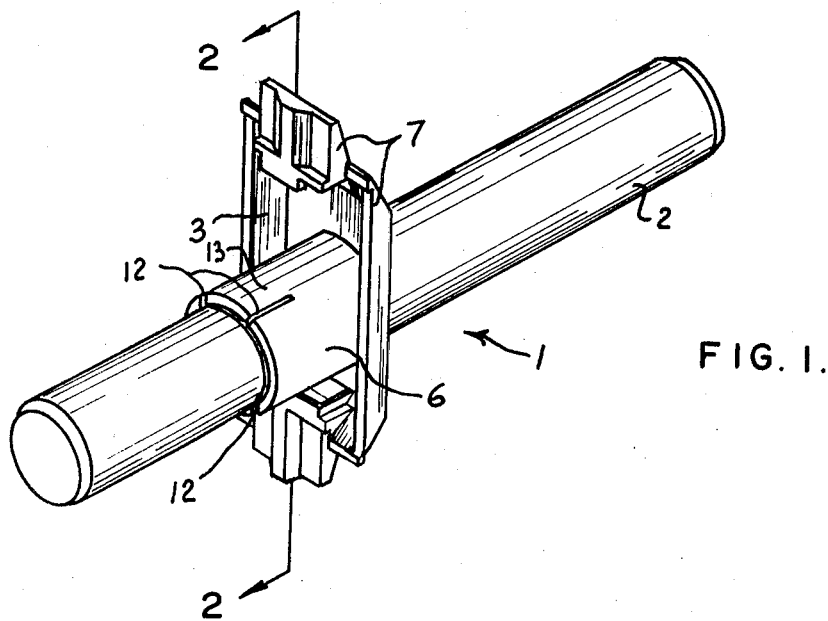
FIG. 1 is a view in perspective of one illustrative embodiment of this invention, mounted on a shaft.

Referring now to FIG. 1, reference numeral 1 indicates the device of this invention. In the embodiment of FIG. 1, the device is illustrated as including structural parts for a centrifugal actuator, certain components of which are not shown in the drawing figures but are shown and described in the Hildebrandt patent, U.S. Pat. No. 3,609,421 mentioned above and incorporated by reference herein. Those skilled in the art will recognize that these conventional actuator parts easily may be attached to the structure shown in FIG. 1. In addition, the sleeve described hereinafter may be used for mounting a variety of subsidiary structures to a motor or other rotating shaft apparatus. For example, the device 1 may be utilized for attaching vent fans to the motor shaft.

Device 1 includes a shaft 2 and a plastic part 3.

Figure 2:
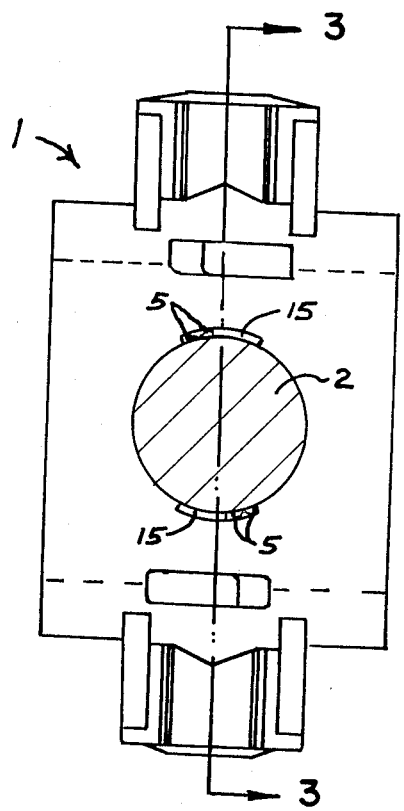
FIG. 2 is a sectional view taken along the line 2—2 of FIG. 1.

The shaft 2 is conventional and commonly is a solid body of metallic material, for example steel, which is adapted for rotation about its ends along bearing surfaces, not shown. The shaft 2 has an annular channel 4 formed in it, best seen in FIG. 3. The channel 4 extends circumferentially about the shaft 2 and has a preselected axial width and radial depth determined by considerations disclosed hereinafter. The shaft 2 also has a plurality of protrusions or splines 5 formed in it. In the embodiment illustrated, two pairs of splines 5 are formed on opposite sides of shaft 2, as is best seen in FIG. 2. Other embodiments of this invention may use fewer or greater numbers of the splines 5. The splines 5 may be formed by a variety of methods. For example, the splines may be manufactured integrally with the shaft or they may be formed by compressing or coining the metal shaft at preselected intervals after shaft 2 construction.

Plastic part 3 includes a sleeve 6 having a flange 7 extending radially outwardly from it. As previously indicated, the flange 7 is utilized to attach components of a centrifugal actuator to the part 3 and the flange 7 is not discussed in detail. Other embodiments of this invention may have a variety of structures attached to the sleeve 6, the flange 7 being exemplary of such structure variety.

Sleeve 6 encompasses an elongated body 8 having an axial opening 9 through it. Opening 9 permits the sleeve 6 to fit over the shaft 2.

The body 8 of the sleeve 6 includes a first end 10 and a second end 11. The end 10, in the embodiment illustrated, has a plurality of spring grooves 12 formed from and through the body 8. I find it convenient to use two pairs of the grooves 12 and to locate those pairs on opposite sides of the body 8. The smaller areas of the body 8, between the grooves 12 define a clasp means 13. Each of the clasp means 13 has a lug 14 integrally formed with it. The lugs 14 project radially inwardly into the opening 9. The opening 9 is sized diametrically so as to pass the shaft 2 freely except along the area of the lugs 14. Because of the lugs 14, the clasp means 13 expand radially outwardly along the grooves 12 whenever the sleeve 6 is placed over the shaft 2. The clasp means 13 remain expanded until the lugs 14 enter the channel 4 in the shaft 2.

Figure 3:
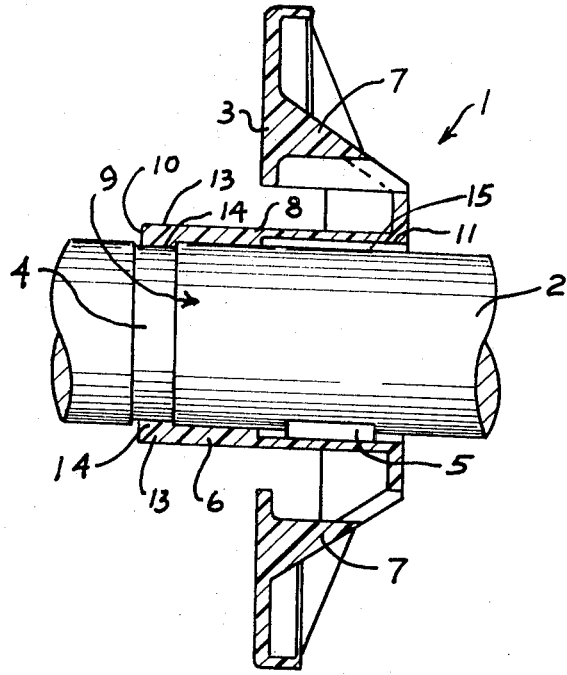
FIG. 3 is a sectional view taken along the line 3—3 of FIG. 2.

The end 11 of body 8 has at least one keyway 15 formed in it which extends radially outwardly from the opening 9. The embodiment illustrated has a pair of keyways 15 formed on opposite sides of the opening 9, as best seen in FIGS. 2 and 3. The keyways 15 are designed to receive the splines 5 in a slip fit when the sleeve 6 is placed over the shaft 2. The angular dimension of the keyway 15 may be varied. That is, the keyway 15 either may be close fitting with the splines 5 to provide a generally rigid mounting, or keyway 15 may be oversized, as shown in FIG. 2, to provide a limited slip rotational mounting which achieves the benefits provided by limited rotational movement of the sleeve, as discussed in the above referenced Hildebrandt patent.

Use of the device 1 of this invention is exceedingly simple. In motor applications, the shaft 2 has a rotor assembly, not shown, mounted to it and the shaft rotates with the rotor assembly in accordance with well known mechanical-electrical principles. Either prior to or after the assembly of the shaft and rotor, the plastic part 3 is attached to the shaft 2. Attachment may be automated or accomplished by hand, if desired. Regardless of method, however, attachment is facilitated if the end 11 of the sleeve 6 is placed over the shaft 2 along that end of the shaft nearest the channel 4. The axial distance between the channel 4 and the spline 5 is chosen so that the lugs 14 will lock in the channel 4 after the splines 5 enter the keyway 15. This distance may vary in different embodiments of the invention. Placing the sleeve 6 over the shaft 2 expands the clasp means 13. As the keyway 15 receives the spline 5, the spring grooves 12 allow the lugs 14 to snap into the channel 4, locking the sleeve 6 in place axially.

Numerous variations, within the scope of the appended claims, will be apparent to those skilled in the art in light of the foregoing description and accompanying drawings. Thus, the keyway 15 may be formed in the shaft 2 and the splines 5 formed in the sleeve 6. Likewise, the relationship of the channel 4 and the lugs 14 may be reversed. The axial length of the sleeve 4 may be varied. A number of devices, other than the flange 7 may be integrally formed with the sleeve in order to mount a variety of devices to the shaft 2. These variations are merely illustrative.

Having thus described the invention, what is claimed and desired to be secured by Letters Patent is:

1. A two piece device intended for simultaneous rotation, comprising:

a solid, metal shaft having an annular channel formed in it, a pair of protrusions formed from said metal shaft, said protrusions lying on diametrically opposite sides of said shaft and extending outwardly from an outer surface of said shaft, said protrusions being spaced from said channel, each of said protrusions including a pair of splines, each of said splines having an outboard face; and a plastic cylindrical sleeve mounted on said shaft, said sleeve having a first end, a second end, and an axial opening in said sleeve between said first and said second ends, said first end having clasp means integrally formed in it, said sleeve further having a first pair and a second pair of grooves through it on diametrically opposite sides of said sleeve along the first end of said sleeve, said groove pairs having a portion of the total surface area of the sleeve between respective pairs of said grooves, said clasp means including a lug extending radially inwardly of said axial opening from each of said portions of said sleeve between respective ones of said groove pairs, the effective diameter of said axial opening being less than the outer diameter of said shaft along at least that portion of said sleeve having said clasp means formed in it, said lugs being engagable in said channel to position said sleeve axially with respect to said shaft, the engagement of said lugs and said channel providing a light frictional drag which is insufficient to prevent all rotational slippage of said sleeve on said shaft during rotation of said shaft in either clockwise or counterclockwise directions, said second end of said sleeve having a pair of keyways formed in it, said keyways extending radially outwardly from said axial opening, said keyways being oversized with respect to said protrusions such that said individual ones of said keyways engage respective ones of said protrusions in the mounted position of said sleeve, the outboard face of respective ones of the spline pairs forming said protrusions adapted to abut said keyways in two relative positions of said sleeve with respect to said shaft, thereby limiting rotational movement of said sleeve.

* * * * *